United States Patent
Barletta et al.

(10) Patent No.: US 7,698,238 B2
(45) Date of Patent: Apr. 13, 2010

(54) EMOTION CONTROLLED SYSTEM FOR PROCESSING MULTIMEDIA DATA

(75) Inventors: Antonio Barletta, Stuttgart (DE); Boris Moser, Walheim (DE); Matthias Mayer, Karlsruhe (DE)

(73) Assignee: Sony Deutschland GmbH, Cologne (DE)

( * ) Notice: Subject to any disclaimer, the term of this patent is extended or adjusted under 35 U.S.C. 154(b) by 155 days.

(21) Appl. No.: 11/093,495

(22) Filed: Mar. 30, 2005

(65) Prior Publication Data
US 2005/0223237 A1    Oct. 6, 2005

(30) Foreign Application Priority Data
Apr. 1, 2004    (EP) .................................. 04007969

(51) Int. Cl.
*G06F 17/00*    (2006.01)
(52) U.S. Cl. .............................. 706/16; 706/21; 463/36
(58) Field of Classification Search .................. 706/16, 706/20, 21; 463/36
See application file for complete search history.

(56) References Cited

U.S. PATENT DOCUMENTS

| | | | |
|---|---|---|---|
| 2,944,542 A | 7/1960 | Barnet et al. | |
| 5,974,262 A | 10/1999 | Fuller et al. | |
| 6,185,534 B1 | 2/2001 | Breese et al. | |
| 6,507,872 B1 * | 1/2003 | Geshwind | 709/236 |
| 6,522,352 B1 * | 2/2003 | Strandwitz et al. | 348/211.2 |
| 2001/0056225 A1 | 12/2001 | DeVito | |
| 2003/0108241 A1 | 6/2003 | Colmenarez et al. | |
| 2003/0117651 A1 | 6/2003 | Matraszek et al. | |
| 2003/0131351 A1 | 7/2003 | Shapira | |
| 2003/0159567 A1 | 8/2003 | Subotnick | |
| 2003/0165270 A1 | 9/2003 | Endrikhovski et al. | |
| 2004/0055448 A1 | 3/2004 | Byon | |

FOREIGN PATENT DOCUMENTS

| | | |
|---|---|---|
| EP | 1 122 687 A2 | 8/2001 |
| EP | 1 256 937 A2 | 11/2002 |
| JP | 2001-100888 | 4/2001 |
| WO | WO 2005/064941 | 7/2005 |

OTHER PUBLICATIONS

Glenstrup et. al., "Eye Controlled Media: Present and Future State", University of Copenhagen DIKU (Institute of Computer Science) Universitetsparken 1 DK-2100 Denmark, 1995.*

(Continued)

*Primary Examiner*—David R Vincent
*Assistant Examiner*—Nathan H Brown, Jr.
(74) *Attorney, Agent, or Firm*—Oblon, Spivak, McClelland, Maier & Neustadt, L.L.P.

(57) ABSTRACT

The present invention relates to an emotion controlled system for processing multimedia data comprising a multimedia system for presenting multimedia content to a user an emotion model means for determining the emotional state of the user during the presentation of the multimedia content and an editing unit for changing said multimedia content in accordance with the emotional state of the user in order to present the changed multimedia content by the multimedia system.

Figure 1:
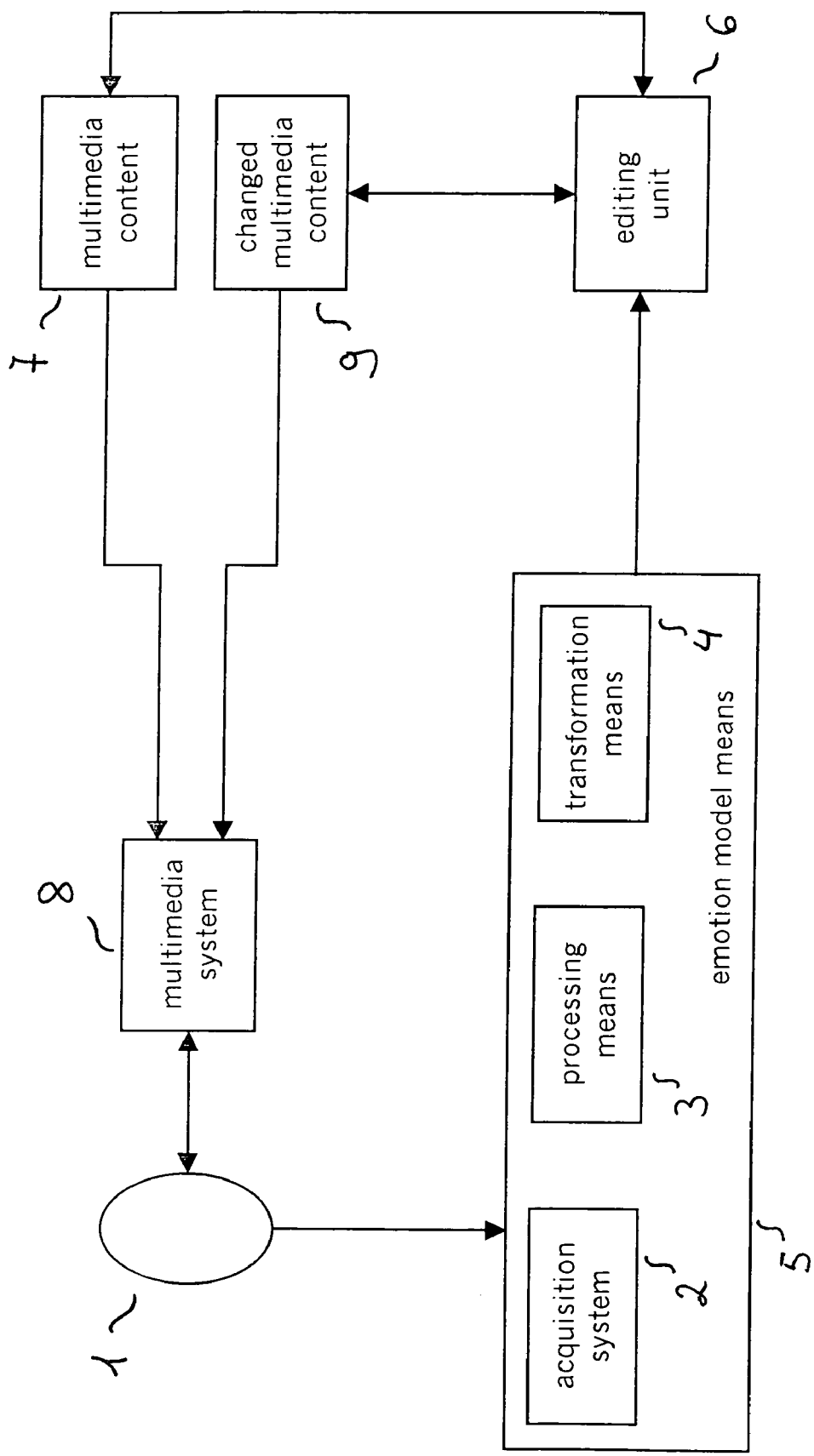

The present invention further relates to a method for executing the steps on this system.

17 Claims, 5 Drawing Sheets

OTHER PUBLICATIONS

Nakatsu et al., "Concept and Construction Example of an Interactive Movie System", Journal of VLSI Signal Processing 27, 141-160, 2001.*

Custodio et al., "Artificial Emotions and Emotion-Based Control Systems", 0-7803-5670-5/99/ 1999, IEEE.*

Glenstrup et. al., "Eye Controlled Media: Present and Future State", 1995, §4.3.*

Shirota, Yukari et al., "A TV Program Generation System Using Digest Video Scenes and a Scripting Markup Language," Proceedings of the 34th Hawaii International Conference on System Sciences, pp. 1-8, Jan. 3, 2001.

Besak, Daniel et al., "Intelligent Biofeedback using an Immersive Competitive Environment," *Ubicomp*, 6 pp, Atlanta, GA, USA, Sep. 30-Oct. 2, 2001.

Li, Francis C. et al., "Browsing Digital Video," Conference on Human Factors in Computing Systems, Proceedings of the SIGCHI conference on Human factors in computing systems, The Hague, The Netherlands, pp. 169-176, ISBN: 1-58113216-6, 2000.

Ball, Gene et al., "Modeling the Emotional State of Computer Users," Workshop on Attitude, Personality and Emotions in User-Adapted Interaction, International Conference on User Modeling, 5 pp., Banff, Canada, Jun. 1999.

Ueoka, Ryoko et al., "Wearable Computer for Experience Recording," ICAT 2001, Dec. 5-7, Toyko, Japan, 6 pp.

Ark, Wendy et al., "The Emotion Mouse," Proceedings of HCI International (the 8th International Conference on Human-Computer Interaction) on Human-Computer Interaction: Ergonomics and User Interfaces, vol. 1, pp. 818-823, ISBN: 08058-3391-9, 1999.

Picard, R. W. et al., "Toward computers that recognize and respond to user emotion," IBM Systems Journal, vol. 39, Nos. 3 and 4, pp. 705-719, 2000.

Healy, Jennifer A., "Wearable and Automotive Systems for Affect Recognition from Physiology," Massachusetts Institute of Technology, 158 pp., May, 2000.

Chiu, Patrick et al., "A Genetic Algorithm for Video Segmentation and Summarization," Proceedings of International Conference on Multimedia and Expo (III), 4 pp., IEEE, 2000, 0-7803-6536-4.

Lienhart, Rainer, et al., University of Mannheim, 68131 Mannheim, Germany, "Video Abstracting," Communications of ACM, 12 pp., Dec. 1997.

Pfeiffer, Silvia et al., Praktische Informatik IV, University of Mannheim, D-68131, Mannheim, Germany, "Abstracting Digital Movies Automatically," Journal of Visual Communications and Image Representation, vol. 7, Issue 4, pp. 345-353, Dec. 1996.

Hirt, Etienne, et al., Art of Technology, Switzerland, "High-density packaging for wrist-wearable medical devices," International Symposium on Microelectronics, vol. 4931, pp. 175-180, 2002, ISBN 0-930815-66-1.

Picard, Rosalind W. et al., "Toward Machine Emotional Intelligence: Analysis of Affective Physiological State," IEEE Transactions on Pattern Analysis and Machine Intelligence, vol. 23, No. 10, pp. 1175-1191, Oct. 2001.

Cacioppo, John T. et al., "Handbook of Psychophysiology," Second Edition, Cambridge Unversity Press, 2000.

* cited by examiner

EMOTION CONTROLLED SYSTEM FOR PROCESSING MULTIMEDIA DATA

This invention relates to an emotion controlled system for processing multimedia data according to claim 1 and to a method for an emotion controlled system for processing multimedia data according to claim 10.

For the presentation of multimedia contents, such as movies, videos or music, a main focus is directed to adapting the presented multimedia content to the consumer's preferences and attitudes. Depending on the consumer's reactions to the presented multimedia content, the same has to be changed in a way, that reflects the consumer's reactions and personalises the multimedia content in an optimum manner.

In the document "A TV Program Generation System Using Digest Video Scenes and a Scripting Markup Language" by Ukari Shirota et al, Proceedings of the 34$^{th}$ Hawaii International Conference on System Sciences, a TV programme generation system is described, where a personalised video or TV programme is created on the basis of data regarding user preferences and emotional expressions selected by the user. Hereby, the user is characterised by attributes or user preferences and such information are used for detechting the emotional state of the user and to change the video or TV programme accordingly.

The disadvantage of the system is that the emotions are deducted from preferences and not from physical real time changes of the user's biometabolism. Therefore, with a system presented in this document, an efficient and detailed adaptation of the programme cannot be effectuated.

Document JP 2001-100888 A reveals a computer user interface which recognises the emotional state of the user and reacts accordingly. Hereby, a face area is extracted from a face image of a user, for which the image of the face is picked up by an infrared camera. On the basis of the luminance of this face area, a face skin temperature is measured and the excitation degree of the user can be found. According to the excitation degree and interest degree of the user discriminated from the face image, the unconscious/non-logical intention of the user is specified, and this is used as a user command to a computer system.

In this document, the reactions of the user are processed for controlling external devices such as computers or the like and does not reveal a detailed application to multimedia content.

It is therefore an objection of the present invention to provide a system and method for changing multimedia content in dependence of the reactions of the user to said multimedia content and to thereby assure a presentation of the multimedia content in a highly personalised way and adapted to the users reactions.

This object is achieved by means of the features of the independent claims.

According to the invention an emotion control system for processing multimedia data is revealed comprising a multimedia system for presenting multimedia content to a user, an emotion model means for determining the emotional state of the user during the presentation of the multimedia content and an editing unit for changing said multimedia content in accordance with the emotional state of the user in order to present the changed multimedia content by the multimedia system.

Further, according to the present invention a method for an emotion controlled system for processing multimedia data is revealed comprising the steps of presenting by a multimedia system multimedia content to a user, determining the emotional state of the user during the presentation of the multimedia content, changing the multimedia content in accordance with the emotional state of the user and presenting the changed multimedia content by the multimedia system.

By using a system and a method, in which the reactions of the user on a multimedia content are measured and are use to adapt the shown multimedia content, an effective change and adaptation of the content and therefore a personalisation to the user can be achieved.

Advantageously the changed multimedia content is created during the presentation of the multimedia content.

Preferably, the changed multimedia content is a program different from the multimedia content.

Further, preferably the changed multimedia content has a quality different than the quality of the multimedia content.

The quality of the changed multimedia content can depend on the level of interest of the user.

Advantageously, the changed multimedia content intensifies the emotional state of the user.

In another preferred embodiment the changed multimedia content is created after the presentation of the multimedia content.

Advantageously the changed multimedia content is a digest of the multimedia content.

In the changed multimedia content emotion data can be embedded.

Figure 2:
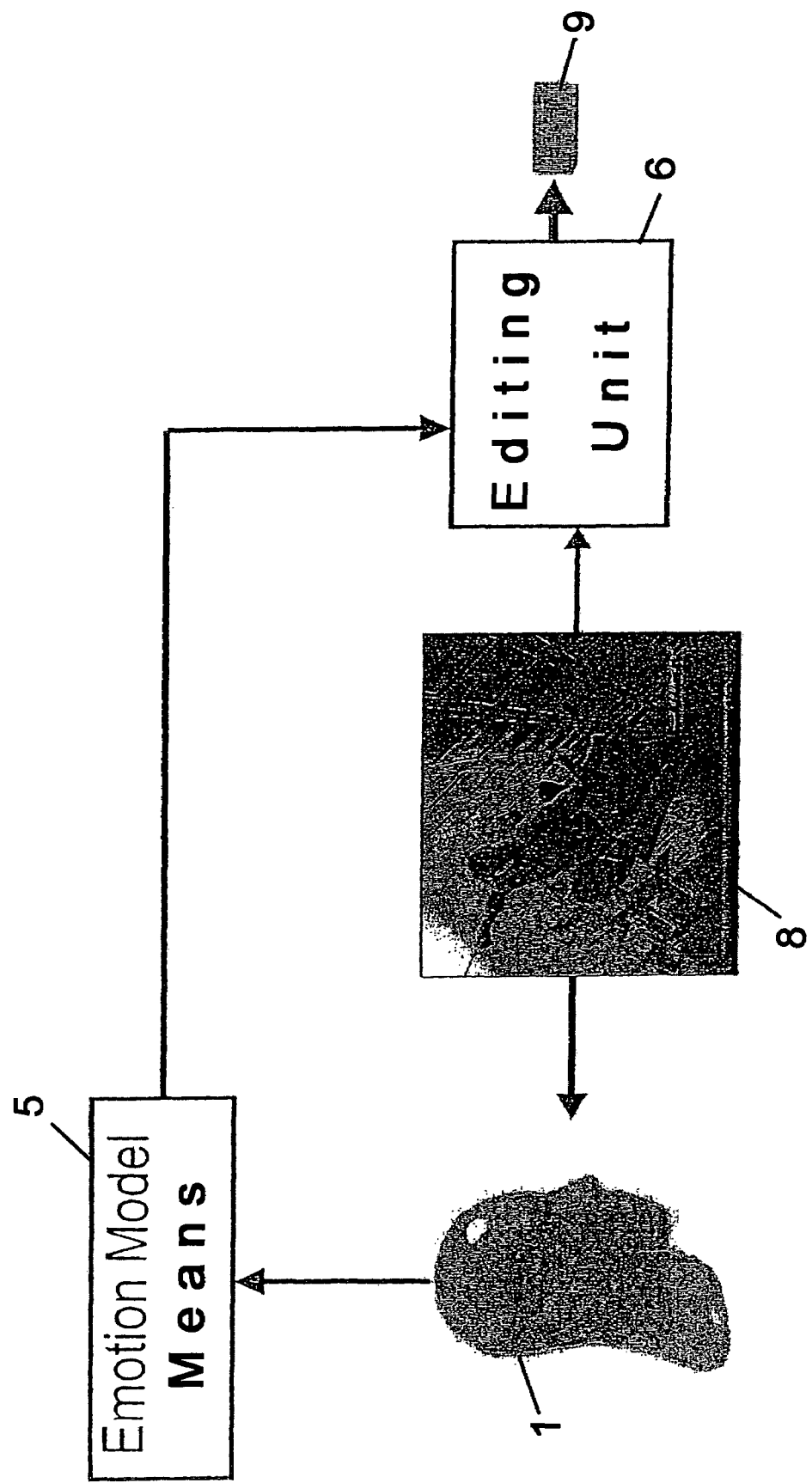
Figure 3:
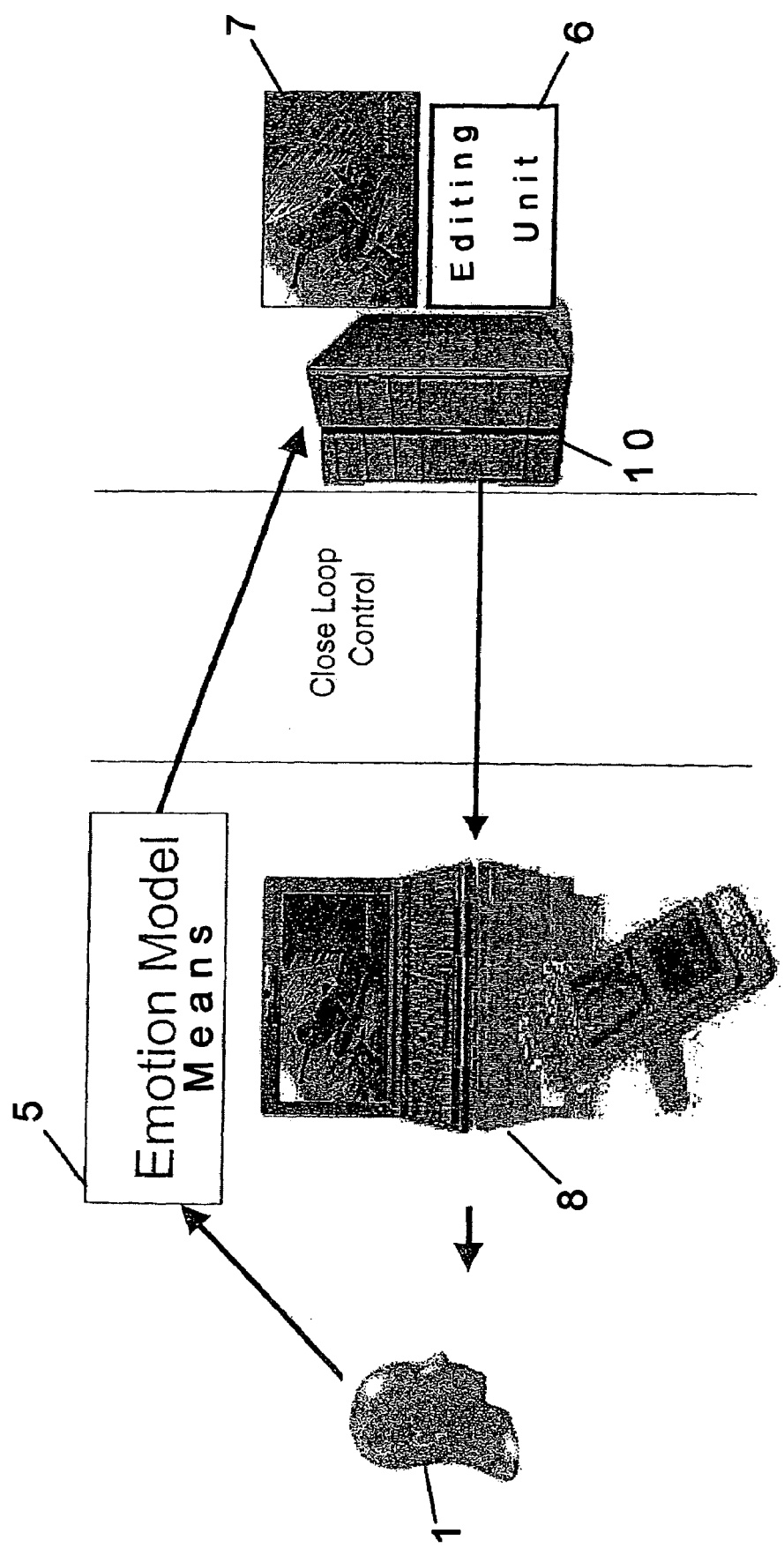
Figure 4:
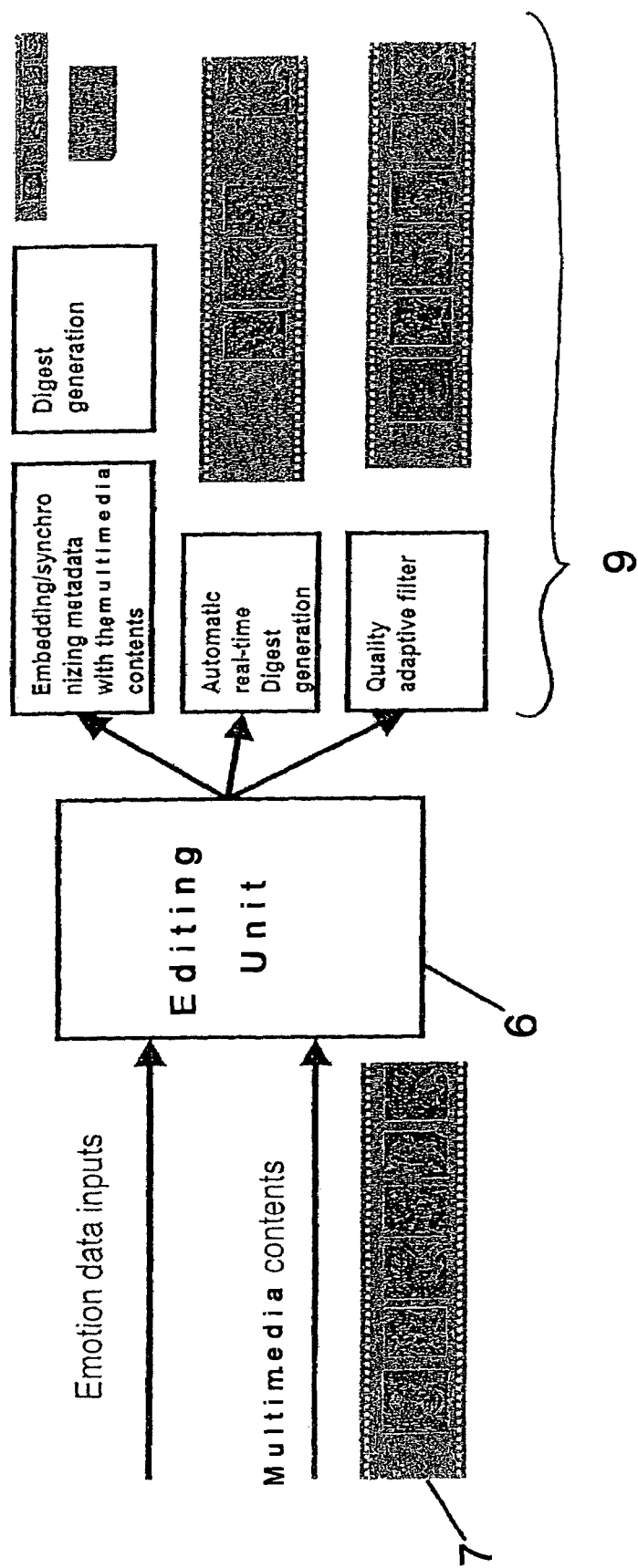
Figure 5:
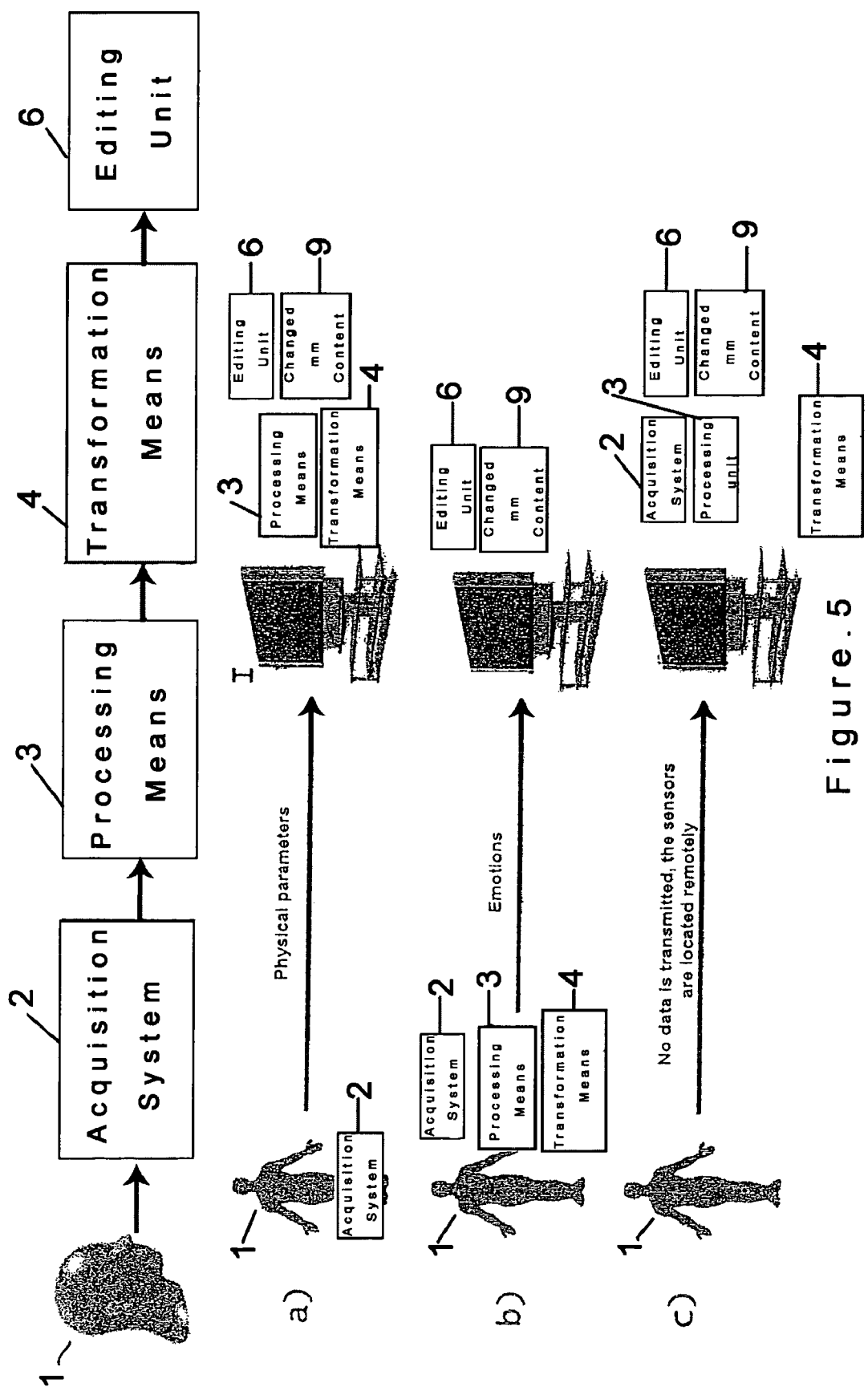

Embodiments of the invention will now be described, by way of example only, with reference to the accompanying drawings in which FIG. 1 is a block diagram showing schematically the elements of the system, FIG. 2 is a block diagram showing a first embodiment of the present invention, FIG. 3 is a block diagram showing a second embodiment of the present invention, FIG. 4 is a block diagram showing an overview over the different embodiments of the present invention and FIG. 5 is a block diagram showing the different implementations of the system of the present invention.

FIG. 1 shows the system according to the present invention. A multimedia content 7 is presented by a multimedia system 8 to a user 1. Such multimedia content may be movies, music, web pages, films, or the like and the multimedia system may be a TV, a computer, or a home environment comprising loudspeakers, display, a HiFi-system, lights or any other devices for presenting and emphasising multimedia content 7.

An emotion model means 5 serves for determining the emotions felt by the user 1 to which a multimedia content 7 is presented by the multimedia system 8. Hereby, the emotion model means 5 comprises an acquisition system 2, a processing means 3 and a transformation means 4. A person during the consumption of multimedia content reacts instinctively to the shown contents with some emotions, e.g. anger, happiness, sadness, surprise or the like. Such mental activity is not constant and its follows the personal attitude of the user. Additionally, such mental activities produce physiological reactions in the human body. The acquisition system 2 serves for detecting and measuring such physiological reactions of a user. Such reactions may be the heart rate, blood pressure, temperature, facial expression, voice, gesture or the like. These reactions can be measured by e.g. biosensors, infrared cameras, microphones and/or any other suitable sensing means. These physically measurable reactions are measured by the acquisition system 2 and are then further submitted to the processing means 3, which processes and evaluates the data submitted by the acquisition system 2. If e.g. the acquisition system 2 samples the heart beat rate, then the processing means 3 may calculate the average value. The evaluated data are then further submitted to the transformation means 4 which, depending on the submitted biological reactions, detects the emotional state of the user. The transformation means 4 therefore comprises algorithms for effectuating such detection of the emotional state of the user 1.

Such an algorithm for detecting the emotional state of the user 1 on the basis of the data acquired by the acquisition means may be as follows: To every emotional state e.g. anger, happiness, fear, sadness or the like a certain value of each measured parameter or a certain interval of values of a measured parameter is assigned. To the emotional state of fear a high heart beat rate, a high blood pressure and the like may be assigned. So the measured physical values are compared with the values or intervals of values assigned to each emotional state and this way the actual emotional state of the user can be detected.

The emotional data determined by the emotion model means 5 are then submitted to an editing unit 6 in order to change the multimedia content 7 depending on the emotion data submitted by the emotion model means 5. The changed multimedia content 9 can then be presented again on the multimedia system 8 to the user 1.

Hereby, the changing of the multimedia content may happen before, during or after the presentation of the multimedia content 7 to a user 1. In a pre-processing for example the reactions and emotions of at least one user not being the end-consumer on a multimedia content may be measured, the content is changed accordingly and afterwards presented to the final consumer. A next possibility is to change the multimedia content at the same time the user 1 is watching it, that means e.g. changing the quality, the sound, the volume or the like of the multimedia content depending on the reaction of the user. A third possibility would be to store the changed multimedia content in order to show it to the user 1 at a later time.

FIG. 2 shows a first embodiment of the present invention. Hereby, the multimedia system 8 presents multimedia content to the user 1 and the emotion model means 5 detects the emotional state of the user during the presentation of the multimedia content 7 and submits these emotional states to the editing unit 6. In the editing unit 6 suitable algorithms process the collected information to create e.g. digests of the viewed video contents. Depending on the algorithm itself different kinds of digests can be produced for different purpose, e.g. e-commerce trailers, a summary of the multimedia contents, a very compact small representation of digital pictures shown as a preview before selection of the pictures themselves, or the like.

Such an automatic system can be applied to both a personal and public usage. For personal usage, the video e.g. can fit the personal needs or attitude of a single person, in the other case it is preferable to apply the method to a vast public for producing a statistic result before automatically addressing different classes of people, e.g. by age, interest, culture, gender etc.

The digest generation can be static or dynamic. Static means, that the digest of a video is generated only once and cannot be changed later. A dynamic generation allows adapting the digest to changing emotions of a person every time the video is watched by this person. That means the digest follows the emotions of a person during lifetime.

As emotions are used to generate a video digest, such a digest is a very personal one. Therefore, the privacy problem has to be solved e.g. by protecting a digest by cryptographic mechanisms.

Another possibility is to use the emotions detected for classifying and analysing multimedia contents. Hereby, the emotional state is embedded in the multimedia content 7 by the editing means 6, that is together with the multimedia content data are stored, which reveal the emotional state, the grade of interest or the like of the user 1. Such information can then be used for post-processing analysis of the multimedia content or for activating intelligent devices in a room environment. This for example opens the possibility to search for and look up information inside a multimedia content by emotion parameters, the user can e.g. search for a scene where he was scared or where he was amused.

FIG. 3 shows a second embodiment of the present invention, where the multimedia content 7 presented by the multimedia system 8 is changed in real time in a closed loop control. That means, that the multimedia contents is automatically and dynamically adapted to the user during playing time.

A first possibility is to detect the actual grade of interest and tension of the user and accordingly change to another scene or programme or continue with the presentation of the multimedia content. Hereby, the analysis of the user's emotion has to be done either at some predefined points of the multimedia content e.g. at the beginning of every new scene or after a predefined time period, e.g. every two minutes or the like. By detecting the actual grade of interest of the user, the attention of the user can be analysed and it can be proceeded to the next scene if the user is not interested in the actual multimedia content. Instead of changing the scenes, also an automatic zapping mode of TV programmes or a selected number of movies may be implemented. Depending on the emotional state of the user and the emotional content associated to movies or TV programmes, an intelligent system might change automatically to a set of user's video choices.

A second possibility of application of the closed loop control is to adapt the quality or the bandwidth for the reproduction or the transmission of the multimedia content. Streaming audio or video contents can be sent with a very high or low quality depending on the level of attention of the user. That means, if a low level of interest by the user is detected then the quality is lowered and on the other hand if the grade of interest of the user is high then also the quality is increased. This is particularly advantageous for multimedia devices with limited network bandwidth and power such as portable phones, PDHs and the like.

A third possibility is to adapt the closed loop control to an interacting home entertainment environment. The multimedia system 8 may comprise not only display and loudspeakers but also other environmental devices such as lights or the like. According to the user's emotional state, a home entertainment system might receive and process emotion information and adapt the environment to such stimula. If for example the user is watching a scary movie and the physical changes related to fear, such as a high heart beat rate or a high blood pressure are submitted to the emotion model means 5 and then afterwards the emotional state of fear is submitted to the editing means 6, then the multimedia system 8 may adapt the environment by dimming down the light or increasing the sound in order to emphasise the emotion felt by the user.

FIG. 4 is an overview over the different applications of the system of the present invention. Hereby, the emotion data and the multimedia contents are both fed to the editing unit 6 and then processed in order to receive different applications. In the first possibility, embedding data is used to associate data to the digital content and the obtained data is then processed to create a digital video digest, e.g. a short video digest, a preview video digest or a longer synthesis of the video. In a second possibility, emotion data and the digital stream are used to produce on the fly a different view. In a third possibility, the quality adaptive mechanism is implemented and in this case the multimedia content is processed using the emotion information to produce a changing video stream.

FIG. 5 is an overview of the different implementations of the system, especially of the emotion model means 5. As already explained the system mainly consists of the acquisition 2, the processing means 3, the transformation means 4 and the editing unit 6. The different parts of the system according to the present invention can be located remotely from each other. In implementation a) the acquisition system 2 is placed directly at the user 1 and the processing means 3 and the transformation means 4 are placed remote from the acquisition means 2, which only submits physical parameters. In this case the acquisition may be a simple bracelet which transmits the bio or haptic data to the processing means 3 and transformation means 4 which then further processes these data to detect the emotional state of the user 1. In implementation b), the acquisition system 2, the processing means 3 and the transformation means 4 are all located near the user 1. Hereby, all these means may be implemented in a smart wearable bracelet or another wearable system transmitting the emotions already detected and processed to the editing unit 6 located remotely. In implementation c) no date from the user 1 are transmitted, but the acquisition system 2 is located remotely from the user. In this case an acquisition system 2, such as cameras, microphones or the like may be used. Also a combination of the implementations a) to c) can be possible.

The invention claim is:

1. A method for an emotion controlled system for processing multimedia data, comprising:
   presenting multimedia content to a user using a multimedia system;
   determining physical parameters of the user during the presentation of the multimedia content using an acquisition unit, said physical parameters including at least one of heart rate, blood pressure, and temperature;
   changing the multimedia content relative the determined physical parameters using an editing unit, the changed multimedia content created in real time while the multimedia content is being presented;
   presenting the changed multimedia content using the multimedia system, said changed multimedia content having a transmission bandwidth different than a transmission bandwidth of the multimedia content, and the transmission bandwidth of the changed multimedia content depending on a level of interest of the user; and
   controlling an environmental device relative the determined physical parameters to intensify an emotional state of the user.

2. The method according to claim 1, wherein the changed multimedia content is a program different from the multimedia content.

3. The method according to claim 1, wherein the changed multimedia content is a digest of the multimedia content.

4. The method according to claim 1, wherein the determined physical parameters are embedded in the changed multimedia content.

5. The method according to claim 1, wherein the environmental device is a light unit.

6. The method according to claim 1, wherein the environmental device is a sound unit.

7. An emotion controlled system for processing multimedia data, comprising:
   a multimedia system configured to present multimedia content to a user;
   an acquisition unit configured to determine physical parameters of the user during presentation of the multimedia content, said physical parameters being at least one of heart rate, blood pressure, and temperature; and
   an editing unit configured to change said multimedia content in accordance with the physical parameters of the user in order to present the changed multimedia content with the multimedia system, said changed multimedia content having a transmission bandwidth different than a transmission bandwidth of the multimedia content, and the transmission bandwidth of the changed multimedia content depending on a level of interest of the user, the editing unit configured to change said multimedia content in real time while said multimedia content is being presented by the multimedia system; and
   an environmental control unit configured to control an environmental device relative the determined physical parameters to intensify an emotional state of the user.

8. The system according to claim 7, wherein the changed multimedia content is a program different from the multimedia content.

9. The system according to claim 7, wherein the changed multimedia content is a digest of the multimedia content.

10. The system according to claim 7, wherein the environmental device is a light unit.

11. The system according to claim 7, wherein the environmental device is a sound unit.

12. A computer readable medium including computer executable instructions, wherein the instructions, when executed by a processor, cause the processor to perform a method, comprising:
   presenting multimedia content to a user;
   determining physical parameters of the user during the presentation of the multimedia content, said physical parameters being at least one of heart rate, blood pressure, and temperature;
   changing the multimedia content relative the physical parameters of the user, said changed multimedia content having a transmission bandwidth different than a transmission bandwidth of the multimedia content, and the transmission bandwidth of the changed multimedia content depending on a level of interest of the user, the changed multimedia content created in real time while the multimedia content is being presented;
   presenting the changed multimedia content; and
   controlling an environment device relative the determined physical parameters to intensify an emotional state of the user.

13. The computer readable medium according to claim 12, wherein the changed multimedia content is a program different from the multimedia content.

14. The computer readable medium according to claim 12, wherein the changed multimedia content is a digest of the multimedia content.

15. The computer readable medium according to claim 12, wherein the determined physical parameters are embedded in the changed multimedia content.

16. The computer readable medium according to claim 12, wherein the environmental device is a light unit.

17. The computer readable medium according to claim 12, wherein the environmental device is a sound unit.

* * * * *